United States Patent
Shan

(10) Patent No.: US 7,505,868 B1
(45) Date of Patent: Mar. 17, 2009

(54) PERFORMING QUALITY DETERMINATION OF DATA

(75) Inventor: Jerry Z. Shan, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 322 days.

(21) Appl. No.: 11/117,989

(22) Filed: Apr. 29, 2005

Related U.S. Application Data

(63) Continuation of application No. 11/047,231, filed on Jan. 31, 2005, now abandoned.

(51) Int. Cl.
*G06F 11/30* (2006.01)

(52) U.S. Cl. .................................... 702/182

(58) Field of Classification Search ............... 702/182, 702/183; 600/345; 700/19
See application file for complete search history.

(56) References Cited

U.S. PATENT DOCUMENTS

| | | | | |
|---|---|---|---|---|
| 6,454,729 | B1 * | 9/2002 | Jacobs et al. | 600/587 |
| 6,985,779 | B2 * | 1/2006 | Hsiung et al. | 700/19 |
| 7,047,089 | B2 * | 5/2006 | Martin et al. | 700/29 |
| 2003/0233273 | A1 | 12/2003 | Jin et al. | |
| 2004/0015458 | A1 | 1/2004 | Takeuchi et al. | |
| 2005/0143873 | A1 * | 6/2005 | Wilson | 701/8 |
| 2005/0203360 | A1 * | 9/2005 | Brauker et al. | 600/345 |
| 2006/0036403 | A1 * | 2/2006 | Wegerich et al. | 702/183 |

OTHER PUBLICATIONS

Shan et al., U.S. Appl. No. 10/322,201, entitled "Method and System for Predicting Revenue Based on Historical Pattern Identification and Modeling," filed Dec. 17, 2002, pp. 1-22, Figs. 1-8.
Shan et al., U.S. Appl. No. 10/355,353, entitled "Method and System for Constructing Prediction Interval Based on Historical Forecast Errors," filed Jan. 31, 2003, pp. 1-21, Figs. 1-6.
Shan et al., U.S. Appl. No. 10/959,861, entitled "Methods and Systems for Cumulative Attribute Forecasting Using A PDF of a Current-To-Future Value Ratio," filed Oct. 6, 2004, pp. 1-18, Figs. 1-6.
BEA WebLogic Server Capacity Planning Guide, Rel. 8.1, 54 pages, Jun. 16, 2003.
J.Z. Shan, "Sequential Detection of Parameter Changes in Linear Dynamic Systems and Regression Models," pp. 1-75 (1995).
J. Shan, U.S. Appl. No. 11/047,283, entitled "Detecting Change in Data," filed Jan. 31, 2005, pp. 1-26, Figs. 1-6.

* cited by examiner

*Primary Examiner*—Tung S Lau
*Assistant Examiner*—Xiuquin Sun

(57) ABSTRACT

To perform data quality assurance, data values from a data source at discrete time points up to time point t are received. At least one estimated value is computed based on at least some of the received data values, and the received data values and estimated data values are applied to an algorithm. A data quality determination of the data value for time point t is performed based on the algorithm.

24 Claims, 6 Drawing Sheets

PERFORMING QUALITY DETERMINATION OF DATA

CROSS-REFERENCE TO RELATED APPLICATION

This is a continuation of U.S. patent application Ser. No. 11/047,231, entitled "Performing Quality Determination of Data," filed Jan. 31, 2005, now abandoned which is hereby incorporated by reference. This is related to U.S. patent application Ser. No. 11/047,283, entitled "Detecting Change in Data," filed Jan. 31, 2005.

BACKGROUND

Companies or other organizations often gather data into data repositories, such as databases or data warehouses, for analysis to discover hidden data attributes, trends, patterns, or other characteristics. Such analysis is referred to as data mining, which is performed by companies or other organizations for planning purposes, for better understanding of customer behavior, or for other purposes.

A database can receive an input data stream from one or more data sources for collection and storage. As data is received, it is sometimes desirable to analyze data values to detect for validity of the data values. For example, an organization may desire to identify invalid or erroneous data values on a more or less real-time basis, such that the organization can act quickly upon detection of invalid or erroneous data values. The ability to act on data values that are invalid or erroneous allows an organization to more quickly identify problem areas such that the errors do not accumulate. The process of identifying errors in data values is referred to as a data quality assurance procedure.

Data quality assurance of data produced by a dynamically changing system is usually difficult to perform accurately. A dynamically changing system is a system that produces data that exhibits non-linear trends, seasonal effects, and heteroscedasticity (varying variability over time). For such dynamically changing systems, detecting for a change in the data that is indicative of a problem in the input data based on calculations of constant means and constant variance typically does not produce accurate results.

DETAILED DESCRIPTION

Figure 1:
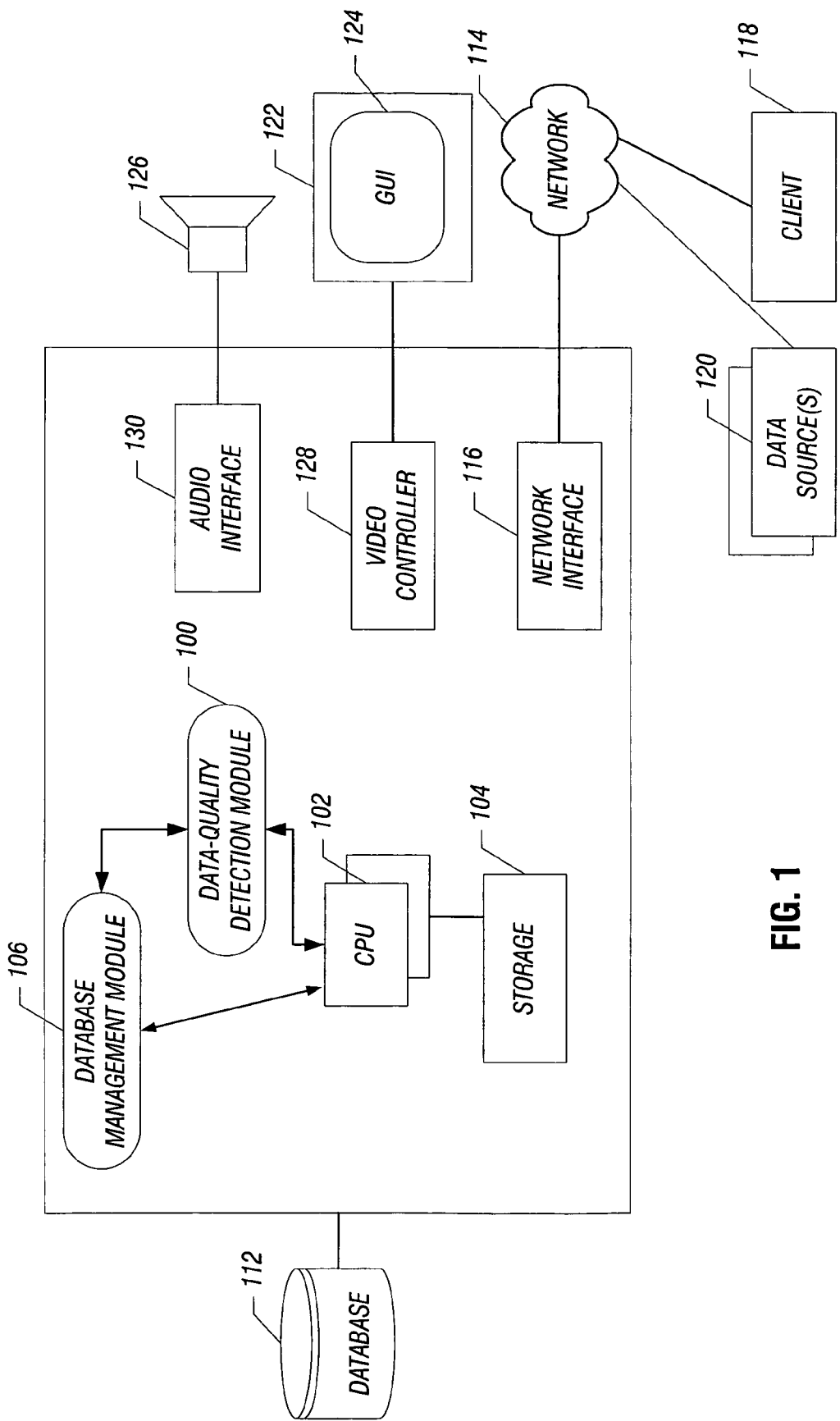
FIG. 1 is a block diagram of a system in which a data-quality detection module according to an embodiment is executable.

FIG. 1 shows an example system that includes a data-quality detection module 100 that is executable on one or plural central processing units (CPUs) 102 in a computer 110. The computer 110 can be a desktop computer, notebook computer, server computer, personal digital assistant (PDA), or other type of computing device. In some embodiments, the data-quality detection module 100 is implemented in software. In other embodiments, the data-quality detection module can be implemented in hardware, or in a combination of hardware and firmware.

The one or plural CPUs 102 are coupled to a storage 104 (which can include volatile memory, non-volatile memory, and/or a mass storage device). The computer 110 also includes a database management module 106 that is executable on the one or plural CPUs 102. Alternatively, the database management module 106 can be executable on a computer that is separate from the computer 110 on which the data-quality detection module 100 is executed. The database management module 106 manages the access (read or write) of data stored in a database 112. The database 112 can be implemented in storage device(s) connected to the computer 110, or alternatively, the database 112 can be implemented in a server or other computer coupled over a data network, such as data network 114.

The computer 110 communicates over the data network 114 through a network interface 116. Example devices or systems that are coupled to the data network 114 include a client 118 and one or plural data sources 120. The data sources 120 (which can be associated with different organizations, departments within an organization, or other types of entities) are able to collect data that is then transmitted over the data network 114 and through the computer 110 for storing in the database 112.

The data-quality detection module 100 checks for the validity of input data to be stored in the database 112. Examples of the input data to be stored in the database 112 include retail or wholesale sales data, invoice data, production volume data, inventory data, revenue data, financial data, cost data, quality control data, and other forms of data. The input data is received as a time series of data values, which includes data values at discrete time points. The data-quality detection module 100 determines whether a data quality problem exists with respect to the data values. If a data quality problem is detected, (e.g., a data value is invalid or erroneous), the data-quality detection module 100 provides an alert (e.g., an alarm) to a user of this data quality problem. Note that the data-quality detection module 100 is also able to check for data quality problems of data for storage in other databases aside from database 112.

According to some embodiments, determining whether a data quality problem exists in a time series of data values is performed by checking for a "systematic" or "structural" change in the input data. A "systematic change" or "structural change" (used interchangeably herein) in data results from some change in a particular system that produced the data, where the data change results from an underlying change in the system rather than from data change occurring as a result of normal operation of the system. The system producing the data is a dynamically changing system (or a system exhibiting non-linear behavior), which produces data that exhibits at least one of non-linear trends, seasonal effects, and heteroscedasticity (varying variability over time) under normal operating conditions. The normal changes that occur in data produced by a dynamically changing or non-linear system result from varying underlying business cycles, business trends, or other factors.

In the ensuing description, the terms "dynamically changing system" or "non-linear system" are used interchangeably to refer to any system that produces data that exhibits non-linear trends, seasonal effects, and heteroscedasticity (varying variability over time) under normal operating conditions.

An underlying change in the dynamically changing or non-linear system that results in a systematic change in data produced by such system can occur due to changes in business environment (e.g., expansion into new markets, loss of market share, unexpected changes in cost structure, etc.) or due to errors or other un-planned anomalies. Errors that can cause a systematic change in the data can be related to an infrastructure error (such as hardware or software error), operator input error (such as due to input of incorrect input values), and so forth. In accordance with some embodiments, by checking for a systematic change in input data values, a determination can be made regarding whether a data value at a particular time point has a data quality problem. A data value is said to have a "data quality problem" if the data value is erroneous or may otherwise be invalid due to various underlying issues, such as a hardware/software error occurring in the system that produced the data value, operator input error, and so forth.

As described in further detail below, detection of a systematic change in input data according to some embodiments is based on first calculating predicted data values (using a predictive model generated from a historical data set) for future time points and comparing the predicted data values to actual data values. The differences between the predicted data values and actual data values represent residual values. The residual values are applied to a cumulative sums (CUSUM) algorithm to check for the systematic change, according to some embodiments.

In other embodiments, a generalized likelihood ratio (GLR) algorithm is used to detect the systematic change. The GRL algorithm calculates a ratio of the likelihood of observed data values based on a model with a change in a mean level (the change in mean level expressed as θ) to the likelihood of observed data values based on a model without the change in mean level (e.g., a zero mean level). The likelihood of observed data values is expressed as a probability density function of the observed data values.

In further embodiments, other algorithms to detect systematic change in data produced by a dynamically changing or non-linear system can be used.

The data-quality assurance procedure provided by the data-quality detection module 100 is able to detect data quality problems substantially in real time. For example, the data values can represent a metric such as daily revenue, daily shipment, daily inventory, daily backlog, and so forth. The data-quality detection module 100 can be used to check for data quality problems in the incoming daily revenue, daily shipment, daily inventory, or daily backlog numbers. Although reference is made to checking for problems in daily metrics, it is contemplated that some embodiments of the invention can be used for checking for data quality problems in metrics having other periodicity, such as hourly, weekly, monthly, and so forth.

In some implementations, an alert provided by the data-quality detection module 100 regarding a data quality problem is presented to a display monitor 122 (that is able to display a graphical user interface or GUI 124) or an audio output device 126 of the computer 110. Thus, the data-quality detection module 100 is able to provide either a visual and/or audio alert to a user in response to detection of a data quality problem or other systematic change in data. The display monitor 122 is coupled to a video controller 128 in the computer 110, and the audio output device 126 is coupled to an audio interface 130 in the computer 110. Alternatively, the data-quality detection module 100 is also able to communicate an alert of a data quality problem or other systematic data change over the data network 114 to a remote computer, such as the client 118. The alert enables a user to act upon the data quality problem or other systematic change in data. The alert can be in the form of a report or other indication.

Figure 2A:
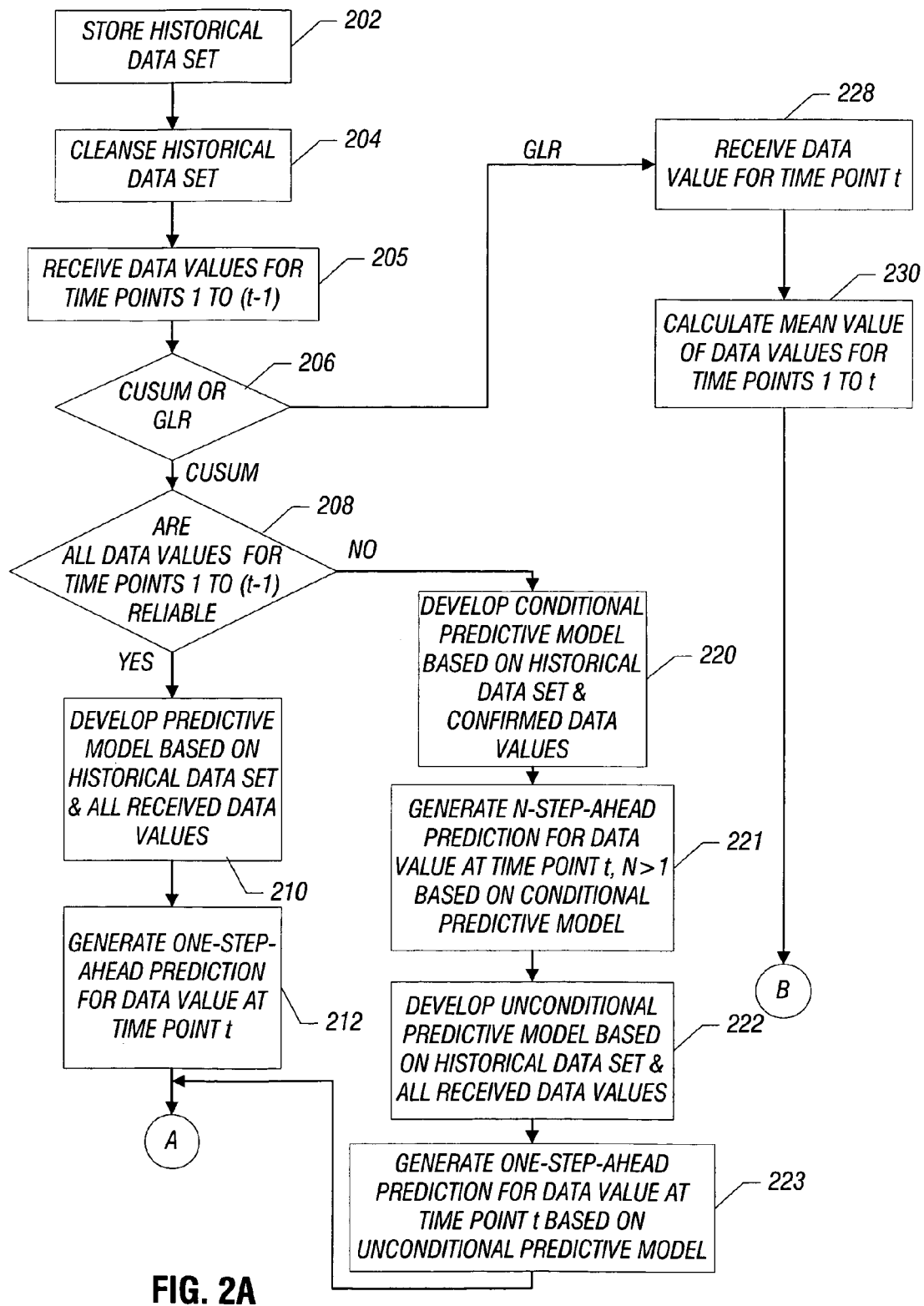
FIGS. 2A-2B depict a flow diagram of a process performed by the data-quality detection module of FIG. 1, in accordance with an embodiment.
Figure 2B:
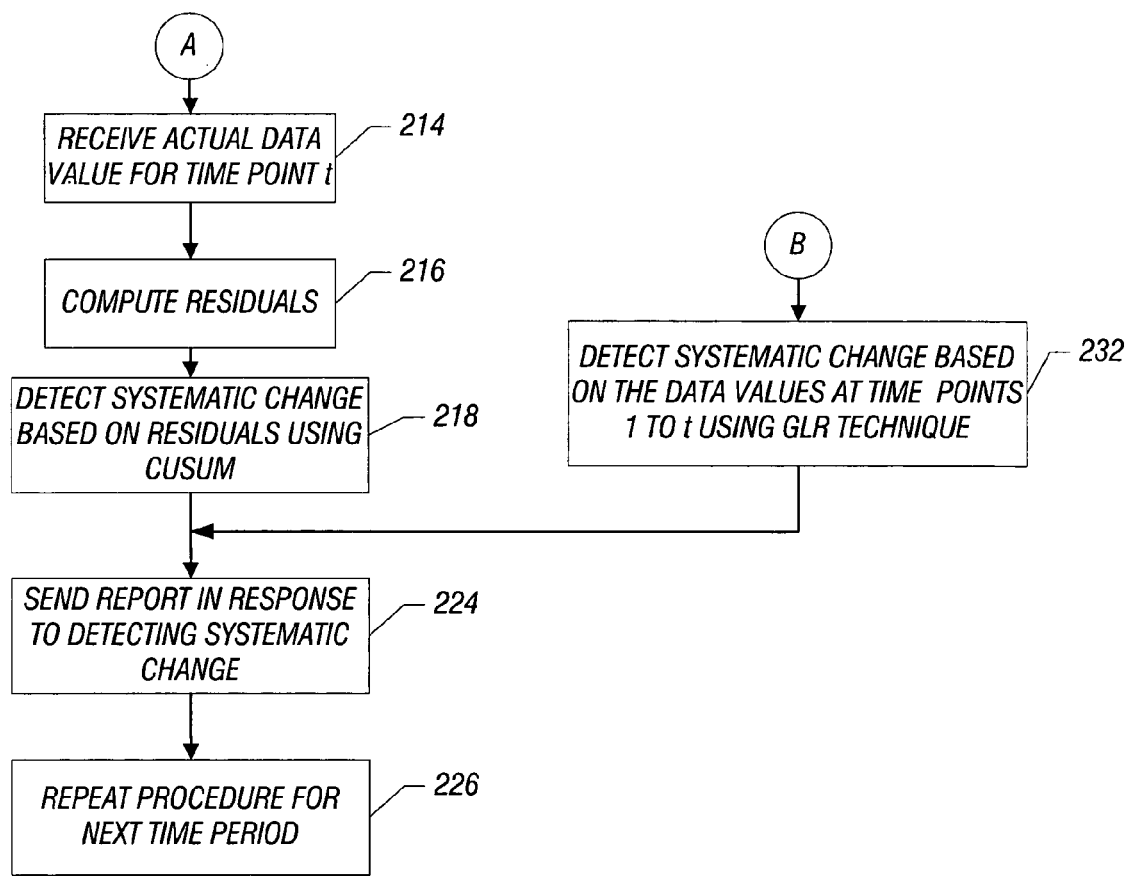

A process performed by the data-quality detection module 100, according to an embodiment, is depicted in FIGS. 2A-2B. A historical data set is stored (at 202) by the data-quality detection module 100. The historical data set refers to data collected over some predefined past time period. In one embodiment, the historical data set is in the form of a time series of data values (e.g., daily sales values, daily revenue values, daily inventory values, and so forth). The historical data set can be stored in the database 112 or at any other storage location.

For better accuracy, the data-quality detection module 100 optionally cleanses (at 204) the historical data set. Any inaccuracies or errors in the historical data set would lead to inaccurate results in the data-quality detection process. Determining whether the historical data set is valid can be performed by using various traditional quality assurance techniques, such as to compute a mean and standard deviation of data values in a time series. In one example, a three-sigma principle is used to decide whether the historical data set is valid. If the data values of the historical data set are outside the three-sigma range, then that indicates that the historical data set may contain an error. If the data is detected to not be valid, the data-quality detection module 100 can check with the data source regarding the validity of the data values, if the data source is available. The data source can be contacted by sending an inquiry regarding data values for a particular time period. For example, the inquiry can be regarding whether monthly sales numbers for some time period match up with the monthly sales numbers maintained by the data source. The data source provides a response to the inquiry to indicate whether or not the data values for the particular time period are valid. However, if the data source is not available, then the data-quality detection module 100 performs one of the following: (1) to not use the invalid data values; or (2) replace the invalid data values with other data values, such as an overall mean value, an overall median value, a local neighborhood mean value, or a local neighborhood median value. An overall mean or median value refers to a value that is calculated based on the entire historical data set. A local neighborhood mean or median value refers to a value that is calculated based on a subset of the historical data set that is close in time to the invalid data values that are being replaced.

The cleansed historical data set is then stored. The data-quality detection module 100 also receives (at 205) data values for days 1 to (t−1) of a time period (e.g., a period between day 1 and day t) that is under consideration (also referred to as the "forecast period"). More generally, the received data values include data values for time points 1 to (t−1), where time points can refer to hours, weeks, months, etc. In one example, if the time points are days, then the data value for day 1 is the data value for day 1 of the current month, and the data value for day (t−1) is the data value for day (t−1) of the current month.

Having received data values for days 1 to (t−1) of the forecast period, the data-quality detection module 100 determines (at 206) whether a CUSUM algorithm is being used or a GLR algorithm is being used for detecting a data quality problem. If the CUSUM algorithm is being used, then steps 208-223 are performed. However, if the GLR algorithm is being used, then steps 228-232 are performed.

Assuming the CUSUM algorithm is being used, the data-quality detection module 100 checks for a data quality problem (or other systematic change) for the data value at time point t of the forecast period. A predicted data value for time point t is compared with the actual data value for time point t, with the difference between the predicted data value and actual data value providing a residual value. The residual value is used by the CUSUM algorithm for determining whether a systematic change has occurred in data, with such systematic change providing an indication of either a data quality problem or some other underlying change of the system that produced the data values.

In the CUSUM algorithm, the data-quality detection module 100 determines (at 208) if all data values for time points 1 to (t−1) are reliable. Reliability of the data values for time points 1 to (t−1) can be based on various factors. For example, data values for the most recent few days may not be reliable due to the lag between reporting preliminary data values and confirmation of such preliminary data values from a data source. If all data values for time points 1 to (t−1) are determined to be reliable, the data-quality detection module 100 develops (at 210) a predictive model based on the historical data set and all data values for time points 1 to (t−1) received for the forecast period. In one embodiment, the predictive model developed at 210 is based on the predictive model generation technique described in U.S. patent application Ser. No. 10/959,861, entitled "Methods and Systems for Cumulative Attribute Forecasting Using a PDF of a Current-To-Future Value Ratio," filed Oct. 6, 2004. The development of this predictive model is described in further detail below. In other embodiments, other types of predictive models can be used.

After developing the predictive model (at 210), the data-quality detection model 100 generates (at 212) a one-step-ahead prediction of data value (for future time point t). A predicted data value is represented by the symbol $\hat{y}_t$. The predicted value $\hat{y}_t$ is one form of an estimated value that is computed for the purpose of detecting systematic change.

Next, after generating the one-step-ahead predicted data value $\hat{y}_t$, the data-quality detection module 100 receives (at 214) the actual data value for time point t after time point t has passed. The actual data value is represented by the symbol $y_t$. Next, the data-quality detection module 100 computes (at 216) a residual value by taking the difference of the predicted data value $\hat{y}_t$ and the actual data value $y_t$, according to the following equation:

$$r_t = \hat{y}_t - y_t \quad \text{(Eq. 1)}$$

Multiple predicted data values $\hat{y}_i$ and actual data values $y_i$ (where i=1 to t) are maintained by the data-quality detection module 100 for determining whether a systematic change has occurred. Predicted data value $\hat{y}_i$ is the predicted data value for time point i calculated at time point (i−1). Similarly, actual data value $y_i$ is the actual data value for time point i. Since the data-quality detection process is an on-going process, the past predicted and actual data values are stored for use in later calculations when checking for a systematic change in data.

The multiple predicted (estimated) data value $\hat{y}_i$ (i=1 to t) are represented as a set $\{y_t\}$, which represents a time series of predicted data values starting at time point 1 and ending at time point t. Similarly, the multiple actual data values $y_i$ (i=1 to t) are represented as a set $\{y_t\}$.

The residual values $r_i$ (i=1 to t) are also represented as a time series of residual values $\{r_t\}$, with each residual value being the difference between the predicted data value $\hat{y}_i$ at a given time point and the actual data value $y_i$ at the given time point.

Next, the data-quality detection module 100 detects (at 218) a systematic change in the data value for time point t based on residual values using the CUSUM algorithm. A discussion of the CUSUM algorithm is described further below.

The data-quality detection module 100 next sends (at 224) a report (or other type of alert) regarding a data quality problem or other systematic change to a predefined output device, such as the audio output device 126, the display monitor 122, or the remote client 118 (all shown in FIG. 1).

Returning to step 208 of FIG. 2A, if the data-quality detection module 100 determines that not all data values for time points 1 to (t−1) are reliable, then only a subset of the data values is used. For example, data values for time points 1 to (t−2) can be determined to be reliable, but the data value for time point (t−1) may not be reliable. As another example, data values for time points 1 to (t−3) can be determined to be reliable, while data values for time points (t−2) and (t−1) may not be reliable.

A conditional predictive model is developed (at 220) based on the historical data set and the "confirmed" data values received for the time period under consideration. The "confirmed" data values are the data values that have been identified as being reliable. As an example, the predictive model can be based on just the data values for time points 1 to (t−2), while the data value for time point (t−1) is not considered for developing the predictive model. This predictive model is referred to as a "conditional" predictive model, since it is based on less than all data values received at time points 1 to (t−1).

Next, the data-quality detection model 100 generates (at 221) an N-step-ahead prediction for data value at time point t, where N>1, based on the conditional predictive model. The N-step-ahead predicted value based on the subset of less than all the received data values is referred to as a conditional predicted value.

In additional to the generation of the conditional predictive model and predicted data value (at 220 and 221), an unconditional predictive model based on the historical data set and all recently received data values (both confirmed and unconfirmed data values) at time points 1 to (t−1) is generated (at 222). From the unconditional predictive model, one-step-ahead predicted data value (unconditional predicted data value) for the data value at time point t is generated (at 223) from the unconditional predictive model. The conditional and unconditional predicted values, and inferences derived from the conditional and unconditional predicted data values, are compared to determine whether convergence can be achieved for the conditional and unconditional computations. As discussed below, the output provided by the data-quality detection module 100 depends upon whether convergence can be achieved.

Steps 214, 216, and 218 of FIG. 2B are performed for both the conditional and unconditional predicted data values. The data-quality detection module 100 next sends (at 224) a report (or other type of alert) regarding a data quality problem or other systematic change to a predefined output device. If the results for the conditional and unconditional predicted data values are able to achieve convergence, then the report sent at 224 provides one set of results (or a combination, such as an average, of the conditional and unconditional results). Convergence is defined as results based on the unconditional predicted values and results based on the conditional predicted values differing by less than a predefined range. If convergence cannot be achieved, then the data-quality detection module sends a report containing both the results based on the conditional predicted data values and the results based on the unconditional predicted data values for consideration by a user.

Optionally, the data-quality detection module 100 can check for a false alarm of a systematic change (or data quality problem), such as by confirming with the data source (or some other source or entity) whether a change in fact occurred at the indicated change point. If a false alarm is detected, then a false alarm rate is recalculated, and thresholds for checking for the data quality problem or other systematic change are reset. The thresholds are used with the CUSUM technique of step 218 for detecting a systematic change. The process described above is then repeated (at 226) for subsequent time points in an on-going process.

The following tasks are performed in response to determining (at 206 in FIG. 2A) that the GLR algorithm is being used. The data-quality detection module 100 receives (at 228) the actual data value at time point t, after time point t has passed. The actual data values $y_i$ (i=1 to t) for time points 1 to t are also referred to as "observed data values." A mean value $\bar{y}$ is calculated (at 230) from the observed data values according to the following formula:

$$\bar{y} = \Sigma_{i=1}^{t} y_i / t.  \quad (Eq. 2)$$

This mean value $\bar{y}$ is used in the GLR algorithm as the θ value for calculating the probability density function $f(y_i - \theta)$, which represents the likelihood of observed data values based on a model with a change in mean level having value $\theta = \bar{y}$. The value $\bar{y}$ is used as an estimated value for θ.

Next, the data-quality detection module 100 detects (at 232) a systematic change based on the observed data values at time points 1 to t using the GLR algorithm, explained in detail further below.

A report of the systematic change detected by the GLR technique that indicates a data quality problem for the data value at time point t is sent (at 224). The procedure is repeated (at 226) for the next time point in the on-going process of detecting data quality problems.

As described above, according to either the CUSUM or GLR algorithm, data values are received from a data source at discrete time points up to a time point t (which is the end of a forecast period). An estimated value (or alternatively multiple estimated values) is (are) computed based on at least some of the received data values. For the CUSUM algorithm, the estimated values include the set of predicted values $\{\hat{y}_t\}$. For the GLR algorithm, the estimated value includes estimating the value of θ with $\bar{y}$, and substituting $\bar{y}$ for θ in the probability density function $f(y_i - \theta)$. The estimated value(s) and the received data values are applied to either the CUSUM or GLR algorithm, which determines whether a systematic change in the data values has occurred. Data quality determination of the data value for time point t can be performed based on detecting the systematic change.

Figure 3:
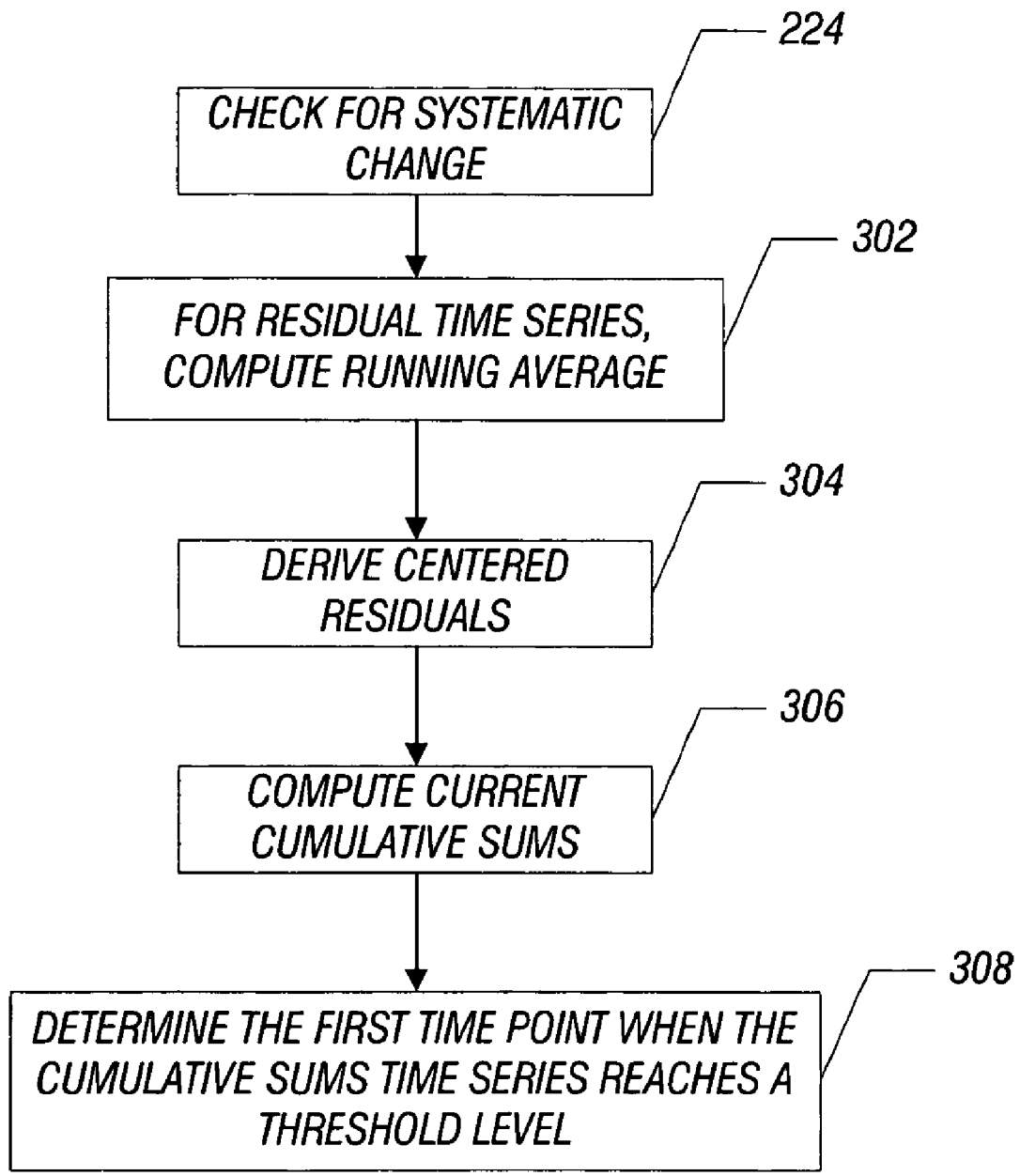
FIG. 3 is a flow diagram of a task of detecting systematic change in data performed in the process of FIGS. 2A-2B.

FIG. 3 shows the tasks involved in checking for a systematic change (218 in FIG. 2B) using the CUSUM algorithm. For the residual time series $\{r_t\}$, a running average $\bar{r}_t$ is computed (at 302). The running average is calculated according to the following equation:

$$\bar{r}_t = \Sigma_{i=1}^{t} r_i / t. \quad (Eq. 3)$$

Basically, the running average is calculated by taking the sum of all the residual values $r_i$ (i=1 to t), and then dividing the sum by the time length t. Next, a centered residual value $r_i(t)$ is calculated (at 304) according to the following equation:

$$r_i(t) = r_i - \bar{r}_t. \quad (Eq. 4)$$

The centered residual value $r_i(t)$ is basically the value of the actual residual value $r_i$ subtracted by the running average value $\bar{r}_t$.

Figure 4:
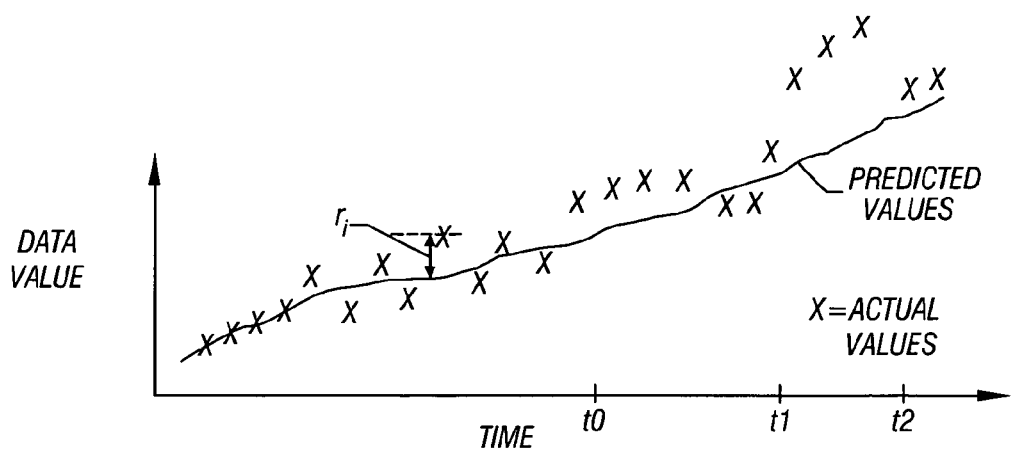
FIG. 4 is a graph showing a time series of data values with the data values including predicted data values generated according to an embodiment and actual data values.
Figure 5:
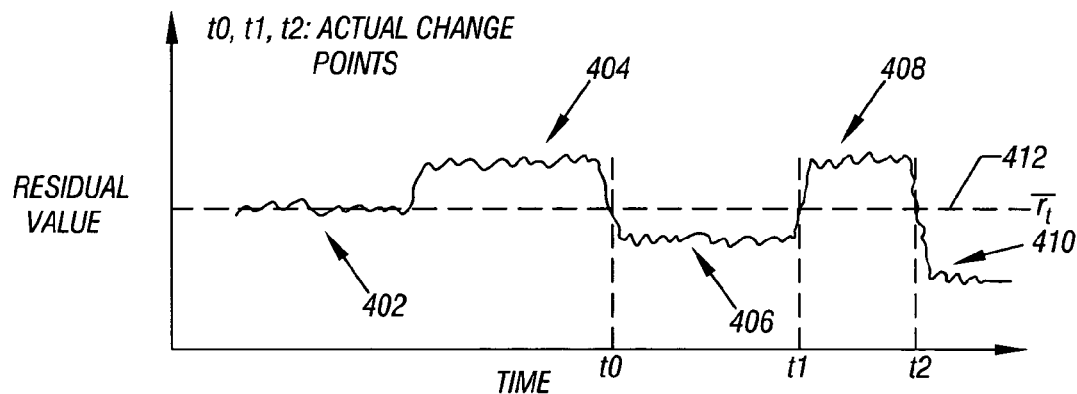
FIG. 5 is a graph showing a time series of residual values calculated from the predicted data values and actual data values of FIG. 4, in accordance with an embodiment.

The concept of residuals is depicted in FIGS. 4 and 5. FIG. 4 is a graph of a time series of data values. The solid line in FIG. 4 represents predicted data values over time (calculated using the predictive model created by step 210 or 220 of FIG. 2A), while the "x" marks actual values at discrete time points. The residual values $r_i$ are equal to the differences between the predicted values and actual values at respective discrete time points.

FIG. 5 is a graph of residual values over time. Time points $t_0$, $t_1$, and $t_2$ represent change points or change times (at which a systematic change has occurred in the input data set). Before time $t_0$, the residual values (indicated generally as 402 and 404) either have values close to (402) or above (404) the running average $\bar{r}_t$ represented by the dashed line 412. After the change point $t_0$, the residual values (represented generally as 406) have values less than the running average $\bar{r}_t$. After the change point $t_1$, the residual values (408) have values greater than the running average $\bar{r}_t$. After change point $t_2$, the residual values (410) have values less than the running average $\bar{r}_t$.

Based on the example of FIG. 5, the centered residual values $r_i(t)$ for $i < t_0$ have positive values, the centered residual values $r_i(t)$ for $t_0 < i < t_1$ have negative values, the centered residual values $r_i(t)$ for $t_1 < i < t_2$ have positive values, and the centered residual values $r_i(t)$ for $i > t_2$ have negative values.

Working with centered residual time series $\{r_i(t)\}$ provides for automatic bias correction, as observed by $\Sigma_{i=1}^{t} r_i(t) = \Sigma_{i=1}^{t} \{r_i - \bar{r}_t\} = 0$. Note that if centered residual values are not used, the summation $\Sigma_{i=1}^{t} r_i$ does not necessarily equal zero. The predictive model generated at 210 or 220 in FIG. 2A can have some built-in bias—the automatic bias correction provided by using centered residual values avoids having to perform some other calibration, which can be more complicated, to adjust for the built-in bias of the predictive model.

As further depicted in FIG. 3, after deriving the centered residual values at 304, the data-quality detection module 100 computes (at 306) the current cumulative sum (CUSUM) values based on the centered residual values, according to the following formula:

$$C(s|t) = \Sigma_{i=1}^{s} r_i(t) = \Sigma_{i=1}^{s} \{r_i - \bar{r}_t\} \text{ for } s = 1, 2, \ldots, t,$$

at each time point t. (Eq. 5)

Figure 6:
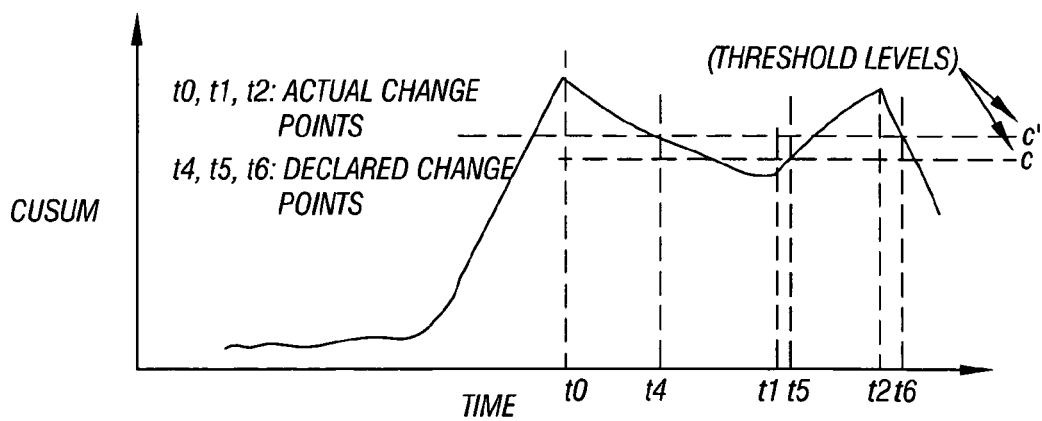
FIG. 6 is a graph showing a time series of cumulative sum values calculated from the residual values of FIG. 5, in accordance with an embodiment.

FIG. 6 is a graph that shows the cumulative sum values over time. Note that prior to change point $t_0$, the cumulative sum values have a positive slope, due to the fact that the centered residual values $r_i(t)$ prior to time $t_0$ is generally less than the running average $\bar{r}_t$. However, after change point $t_0$ and before change point $t_1$, the cumulative sum values have a negative slope over time, since the residual values after time $t_0$ and before time point $t_1$ are generally less than the running average $\bar{r}_t$. Similarly, the cumulative sums after change point $t_1$ but before change point $t_2$ have a positive slope, and the cumulative sums after change point $t_2$ have a negative slope.

Calculating the cumulative sum values effectively magnifies any systematic change that may have occurred in the input data set. The magnification of the systematic change allows for easier and more accurate detection by the data-quality detection module 100 of FIG. 1. Note that FIG. 6 shows cumulative sum values for one example of input data values.

As further shown in FIG. 3, the data-quality detection module 100 determines (at 308) the time points (referred to as "declared change points") at which the cumulative sums time series changes direction (goes from a positive slope to a negative slope or vice versa) and reaches or crosses over a threshold level (depicted as c or c' in FIG. 6). In the example of FIG. 6, a first such time point is the first time point (declared change point) after the cumulative sums have changed directions (at change point $t_0$, which is the actual change point) from a positive slope to a negative slope, and at which the cumulative sums cross the threshold c' (which occurs at time point $t_4$, which is the declared change point).

In the on-going process of detecting for additional systematic changes, the data-quality detection module next detects a change of direction of the slope of the cumulative sums (from a negative slope to a positive slope) at change point $t_1$. After the change point $t_1$ (actual change point), the cumulative sums cross the threshold c at time point $t_5$ (declared change point). Next, the cumulative sums change direction again at change point $t_2$ (actual change point), following which the cumulative sums cross the threshold c' at time point $t_6$ (declared change point). The time points at which the cumulative sums cross respective thresholds are time points $t_4$, $t_5$, and $t_6$, as depicted in FIG. 6 (which are the time points the data-quality detection module declares as the change points). The delays between time points $t_0$ and $t_4$, between time points $t_1$ and $t_5$, and between time points $t_2$ and $t_6$, are referred to as detection delays. A detection delay is the time between an actual change point (e.g., $t_0$, $t_1$, $t_2$) and the declared change point (e.g., $t_4$, $t_5$, $t_6$).

To adjust the detection delay, the threshold c or c' can be changed. Adjusting the threshold to increase or decrease its value can increase or reduce the detection delay. However, changing the threshold would likely cause a change in a false alarm rate of systematic changes. Adjusting a threshold to reduce detection delay usually leads to an increased false alarm rate, and vice versa. A user can set the threshold c or c' according to system performance to achieve a balance between detection delay and false alarms.

The first time point (declared change point) at which the cumulative sums time series reaches a threshold level c or c' is defined according to the following formula:

$$s^* = \min\{s: C(s|t) = \Sigma_{i=1}{}^s r_i(t) \leq c\} \text{ or}$$

$$s^{**} = \min\{s: C(s|t) = \Sigma_{i=1}{}^s r_i(t) \leq c'\}.$$

In the equations above, s* represents the time point (declared change point) at which the cumulative sums cross over threshold c, and s** represents the time point (declared change point) at which the cumulative sums cross under threshold c'.

Alternatively, instead of using the CUSUM algorithm discussed above, a GLR algorithm can be used (for detecting a systematic change at 232 in FIG. 2B). The following equation defines a rule based on GLR statistics for detecting occurrence of a change point:

$$s *= \inf\left\{t : \max_{1 \leq k \leq t} \sup_{\theta} \sum_{i=k}^{t} \log \frac{f(y_i - \theta)}{f(y_i)} \geq b\right\} \quad \text{(Eq. 6)}$$

-continued $$= \inf\left\{t : \max_{1 \leq k \leq t} \frac{\left(\sum_{i=k}^{t} y_i\right)^2}{2(t - k + 1)} \geq b\right\}.$$

The function $f(y_i)$ is the probability density function representing likelihood of observed data values when the mean is 0. In contrast, the function $f(y_i - \theta)$ is the probability density function with a change in the mean expressed as a value $\theta$. A probability density function is a function defined on a continuous interval so that the area under the curve described by the function is unity (meaning equal to 1). In the above equation, the expression "inf" indicates calculation of a minimum first t value at which the left side of the equation exceeds or is equal to a threshold value b. The expression $\tilde{\theta}$ is equivalent to taking the maximum likelihood estimate of $\theta$ in its value domain. With the assumption that the densities are normal, the maximum likelihood estimate of $\theta$ is the sample mean (which is the average or mean of the $y_i$ values where i=1 to t), and the simplified expression of the likelihood ratio as shown on the second line of Eq. 6 can be readily obtained.

To solve Eq. 6, the unknown value $\theta$ is first substituted with an estimated value. In accordance with some embodiments of the invention, the value of $\theta$ is replaced with $\bar{y}$, which is the mean value of the observed data values $y_1$ to $y_t$. The mean value $\bar{y}$ is calculated according to Eq. 2 above.

Thus, according to Eq. 6, the first time point at which the left side of the equation exceeds or is equal to the threshold value b, is expressed as s*. The parameter s* thus represents a time point at which a systematic change is detected by the GLR algorithm.

Figure 7:
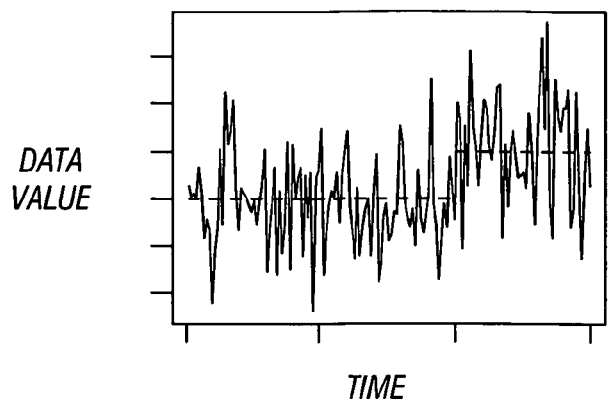
FIG. 7 is a graph showing a time series of observed data values for use by a generalized likelihood ratio (GLR) algorithm or a window-limited GLR algorithm according to other embodiments.
Figure 8:
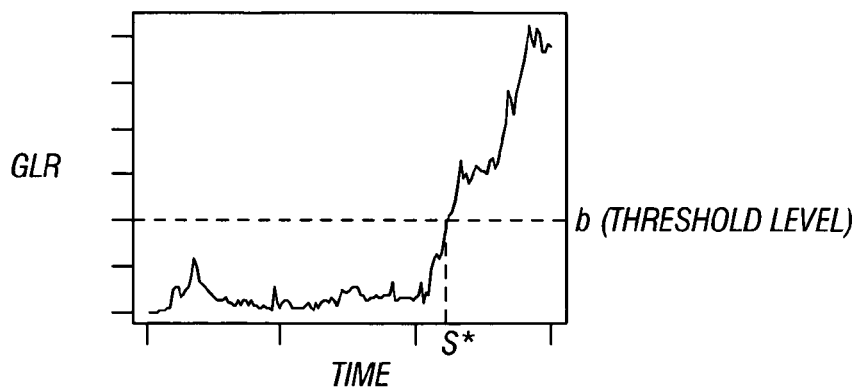
FIG. 8 is a graph showing a time series of data values calculated by the GLR algorithm according to another embodiment.

FIG. 7 illustrates another example time series of observed data values $y_i$. FIG. 8 shows the values (GLR values) calculated from the left side of Eq. 6 over time. The time point at which the GLR values first cross over the threshold value b is indicated as s* in FIG. 8.

Alternatively, a window-limited GLR technique is used, with the rule expressed as follows:

$$s_M^* = \inf\left\{t : \max_{t - M \leq k \leq t} \frac{\left(\sum_{i=k}^{t} y_i\right)^2}{2(t - k + 1)} \geq b\right\}. \quad \text{(Eq. 7)}$$

Figure 9:
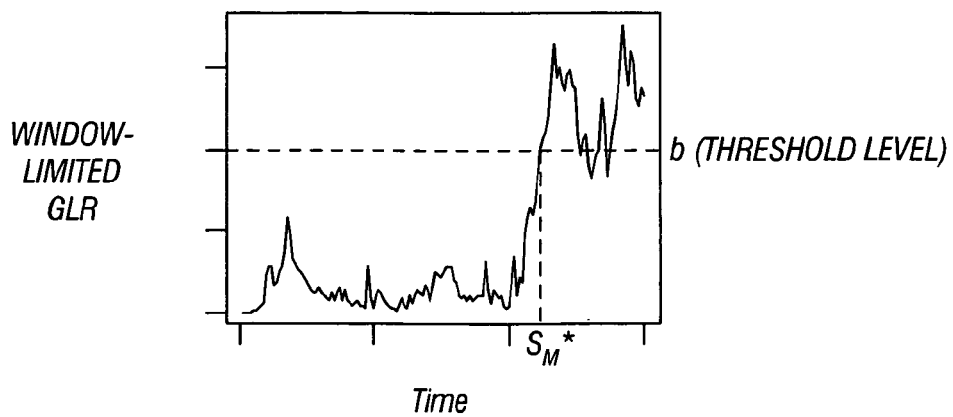
FIG. 9 is a graph showing a time series of data values calculated by the window-limited GLR algorithm according to a further embodiment.

With the window-limited GLR technique, a window size M is specified. The window size M takes into account only the data values $y_i$ at time points t–M to t. Effectively, the window-limited GLR technique uses a truncated time window, having size M, which provides increased efficiency in processing. The window-limited GLR technique also automatically refreshes and restarts input data for subsequent data-quality detection, since only data values for the last M time points are considered. FIG. 9 depicts the window-limited GLR values (values of the left side of the inequality of Eq. 7 over time). The first time that the window-limited GLR values across the threshold b is indicated in FIG. 9 as $s^*_M$.

As discussed above in connection with FIG. 2A, for the CUSUM algorithm, a predictive model is generated (at 210 or 220) based on a historical data set and at least some data values received for the forecast period. As noted above, generation of the predictive model at 210 or 220 in FIG. 2A is based on the technique described in U.S. patent application Ser. No. 10/959,861, referenced above. The predictive model can be based on all received data values at time points 1 to (t−1), or alternatively, the predictive model can be based on less than all received data values, such as data values 1 to (t−2) (with the data value for time points 1 to (t−1) being ignored if such data value cannot be confirmed).

In the following discussion, let $S_i$ represent the cumulative attribute as a function of time i as the time ranges from i=1 to the end of the forecast period i=t. For example, t can be day 5, so that the forecast period includes days 1 to 5. The value of $S_1$ is $x_1$, the value $S_2$ is $x_1+x_2$, the value of $S_3$ is $x_1+x_2+x_3$, and the value of $S_t$ is $x_1+x_2+\ldots+x_t$. The cumulative attribute $S_i$ is a stochastic variable having a probability density function $f_{s_i}(S_i)$ that varies as a function of time. Let $f_{s_t}(S_t)$ represent the probability density function for $S_t$, the value of the cumulative attribute at the end of the forecast period. (It is this end-of-period value $S_t$ that is to be forecast or predicted.) Calculation of the probability density functions $f_{s_i}(S_i)$ is based on historical data.

This end-of-period value $S_t$ is based on determination of the conditional probability density function $f(S_t|S_i)$, which is the probability distribution for the end-of-period attribute value $S_t$ when an intermediate attribute value $S_i$ is known.

Bayes' formula for a conditional probability gives:

$$f(S_t \mid S_i) = \frac{f(S_i, S_t)}{f_{S_i}(S_i)}. \tag{Eq. 8}$$

The joint probability density function can be expressed using Bayes' formula:

$$f(S_t \mid S_i) = \frac{f(S_i \mid S_t) f_{S_t}(S_t)}{f_{S_i}(S_i)}. \tag{Eq. 9}$$

A reformulation of the conditional probability density function $f(S_i|S_t)$ is as follows:

$$f(S_i \mid S_t) = \frac{1}{S_t} f_{R_i}(R_i \mid S_t) = \frac{1}{S_t} f_{R_i}(S_i/S_t \mid S_t), \tag{10}$$

where the random variable has been scaled to obtain the ratio $R_i = S_i/S_t$. It can be shown that:

$$f(S_t \mid S_i) = \frac{1}{S_t} \frac{f_{R_i}(S_i/S_t) f_{S_t}(S_t)}{f_{S_i}(S_i)}. \tag{Eq. 11}$$

When forecasting for $S_t$, the current attribute value $S_i$ is observed and fixed, so the denominator can be dropped in favor of a proportionality constant, giving:

$$f(S_t \mid S_i) \propto \frac{1}{S_t} f_{R_i}(S_i/S_t) f_{S_t}(S_t), \tag{Eq. 12}$$

where ∝ represents proportionality. The proportionality constant can simply be determined by integration since the area under any probability density function is equal to unity.

Eq. 12 provides a relationship that can be used for forecasting an end-of-period attribute value $S_t$ with knowledge of a current attribute value $S_i$, the unconditional probability density function for the ratio $R_i$ and the unconditional probability density function for the end-of-period attribute value $S_t$. Advantageously, these unconditional probability density functions can be derived even with only a limited amount of historical information.

Instructions of the data-quality detection module 100 (FIG. 1), which can be implemented in software, are loaded for execution on a processor (e.g., CPU 102). The processor includes a microprocessor, microcontroller, processor module or subsystem (including one or more microprocessors or microcontrollers), or other control or computing devices. As used here, a "controller" refers to hardware, software, or a combination thereof. A "controller" can refer to a single component or to plural components (whether software or hardware).

Data and instructions (of the software) are stored in respective storage devices, which are implemented as one or more machine-readable storage media. The storage media include different forms of memory including semiconductor memory devices such as dynamic or static random access memories (DRAMs or SRAMs), erasable and programmable read-only memories EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method of performing data quality assurance, comprising:
    receiving data values from a data source at discrete time points up to and including time point t;
    computing at least one estimated value based on at least some of the received data values;
    applying the received data values and the at least one estimated value to one of a first algorithm and a second algorithm for detecting changes in the data values, wherein the at least one estimated data value comprises predicted data values for the first algorithm, and the at least one estimated data value comprises a mean of the at least some received data values for the second algorithm, wherein the first algorithm computes cumulative sums based on the received data values and predicted data values, and the second algorithm computes a probability distribution function based on the received data values and the mean;
    performing a data quality determination of the data value for time point t based on one of the first and second algorithms; and
    providing an indication of the data quality determination for output by an output device.

2. The method of claim 1, wherein performing the data quality determination comprises indicating a data quality problem for the data value at time point t in response to the algorithm detecting a systematic change at time point t.

3. The method of claim 1, wherein the first algorithm is used, and wherein computing the cumulative sums according to the first algorithm comprises:

computing residual values based on the received data values and the predicted data values;
calculating the cumulative sums derived from the residual values; and
comparing the cumulative sums against at least one threshold to detect a data quality problem.

4. The method of claim 3, further comprising:
calculating centered residual values that are derived from subtracting an average value of the computed residual values from the computed residual values,
wherein calculating the cumulative sums comprises calculating cumulative sums of the centered residual values.

5. The method of claim 1, wherein applying the received data values and the predicted data values to the first algorithm comprises applying the received data values and the predicted data values to a cumulative sums algorithm.

6. The method of claim 1, wherein applying the received data values and the mean to the second algorithm comprises applying the received data values and the mean to a generalized likelihood ratio (GLR) algorithm.

7. The method of claim 6, wherein applying the received data values and the mean to the GLR algorithm comprises applying the received data values and the mean to a window-limited GLR algorithm.

8. The method of claim 6, wherein performing the data quality determination using the GLR algorithm comprises calculating a ratio of a likelihood of the received data values based on a model with a change in mean level by the mean of the received data values, to a likelihood of the received data values without the change in the mean level.

9. The method of claim 1, wherein providing the indication for output by the output device comprises providing the indication for output by one of an audio device and a display device.

10. The method of claim 1, wherein the first algorithm is used, the first algorithm comprising a cumulative sums algorithm, and wherein the predicted data values comprise a first set of predicted data values computed using a first predictive model, the method further comprising:
generating a first result based on applying the first set of predicted values to the cumulative sums algorithm;
computing a second set of predicted data values using a second predictive model;
applying the second set of predicted data values to the cumulative sums algorithm for detecting changes in the received data values;
generating a second result based on applying the second set of predicted data values to the cumulative sums algorithm;
determining convergence of the first result and second result;
producing a first output in response to determining that the first result and second result have converged; and
producing a second output in response to determining that the first result and second result have not converged.

11. An article comprising at least one storage medium containing instructions that when executed cause a processor to:
receive data values from a data source at discrete time points;
compute predicted values for a forecast period based on a historical data set and at least some of the received data values;
apply the predicted values to a cumulative sums algorithm for detecting a data quality problem in the received data values;
provide an indication of the data quality problem for output by an output device, wherein detecting the data quality problem in the received data values using the cumulative sums algorithm comprises:
computing residual values based on the received data values and the predicted data values;
calculating aggregate values derived from aggregating the residual values; and
comparing the aggregate values against at least one threshold to detect a change point in the received data values, the change point being one of the discrete time points, and indicating a data quality problem with the data value at the change point,
wherein calculating the aggregate values comprises calculating cumulative sums of the residual values, and
wherein comparing the aggregate values comprises comparing the cumulative sums against the at least one threshold;
generate a predictive model based on the historical data set and at least some of the received data values;
wherein computing the predicted data values comprises computing the predicted data values using the predictive model,
wherein detecting the data quality problem in the received data values using the cumulative sums algorithm further comprises:
calculating centered residual values by subtracting an average residual value from corresponding computed residual values,
wherein calculating the cumulative sums comprises calculating the cumulative sums of the centered residual values.

12. The article of claim 11, wherein calculating the cumulative sums of the centered residual values automatically compensates for a built-in bias of the predictive model.

13. An article comprising at least one storage medium containing instructions that when executed cause a processor to:
receive data values from a data source at discrete time points;
compute predicted values for a forecast period based on a historical data set and at least some of the received data values;
applying the predicted values to a cumulative sums algorithm for detecting a data quality problem in the received data values;
provide an indication of the data quality problem for output by an output device,
wherein computing the predicted values comprises computing a first set of predicted values using a first predictive model, and wherein the first set of predicted values is applied to the cumulative sums algorithm for detecting the data quality problem,
wherein the instructions when executed cause the processor to further:
generate a first result based on applying the first set of predicted values to the cumulative sums algorithm;
compute a second set of predicted values using a second predictive model;
apply the second set of predicted values to the cumulative sums algorithm for detecting the data quality problem in the received data values; and
generate a second result based on applying the second set of predicted values to the cumulative sums algorithm.

14. The article of claim 13, wherein the instructions when executed cause the processor to further:
determine convergence of the first result and second result;

produce a first output in response to determining that the first result and second result have converged; and produce a second output in response to determining that the first result and second result have not converged.

15. The article of claim 13, wherein the instructions when executed cause the processor to:

derive the first predictive model using the historical data set and all of the received data values at the discrete time points; and derive the second predictive model using the historical data set and less than all of the received data values at the discrete time points.

16. A system comprising:

a processor; and a detection module executable on the processor to:

receive a time series of data values;

calculate at least one estimated value based on at least some of the received data values;

detect a change in the received data values with one of a first algorithm and a second algorithm that uses the received data values and the at least one estimated value, wherein the at least one estimated data value comprises predicted data values for the first algorithm, and the at least one estimated data value comprises a mean of the at least some received data values for the second algorithm, wherein the first algorithm computes cumulative sums based on the received data values and predicted data values, and the second algorithm computes a probability distribution function based on the received data values and the mean; and indicate a data quality problem in the received data values based on the change.

17. The system of claim 16, wherein the time series includes time points 1 to t, the data quality problem for the data value at time point t being indicated in response to detecting a systematic change occurring at time point t.

18. The system of claim 16, wherein the detection module is executable to use the first algorithm, and wherein the first algorithm comprises a cumulative sums algorithm.

19. The system of claim 18, wherein the predicted data values are computed using a predictive model based on at least some of the received data values and a historical data set.

20. The system of claim 19, wherein the detection module is executable to further:

calculate residual values based on differences between the predicted data values and received data values;

the change detected by the cumulative sums algorithm using the residual values.

21. The system of claim 16, wherein the detection module is executable to use the second algorithm, and wherein the second algorithm comprises a generalized likelihood ratio algorithm.

22. A system comprising:

means for receiving data values from a data source at discrete time points up to time point t;

means for computing at least one estimated value based on at least some of the received data values;

means for applying the received data values and at least one estimated value to one of a first algorithm and a second algorithm for detecting a systematic change in the data values, wherein the at least one estimated data value comprises predicted data values for the first algorithm, and the at least one estimated data value comprises a mean of the at least some received data values for the second algorithm, wherein the first algorithm computes cumulative sums based on the received data values and predicted data values, and the second algorithm computes a probability distribution function based on the received data values and the mean;

means for performing a data quality determination of the data value for time point t based on one of the first and second algorithms for detecting the systematic change in the data values; and means for providing an indication of the data quality determination for output by an output device.

23. The system of claim 22, wherein the first algorithm comprises a cumulative sums algorithm and the second algorithm comprises a generalized likelihood ratio algorithm.

24. A method comprising:

storing a historical data set;

receiving input data values at discrete time points;

calculating predicted data values based on the historical data set and at least some of the received input data values;

computing residual values calculated from differences between the predicted data values and received data values;

determining a data quality problem in a data value at one of the discrete time points with a cumulative sums algorithm that uses the residual values; and providing an indication of the data quality problem for output by an output device, wherein the predicted data values comprise a first set of predicted data values computed using a first predictive model, the method further comprising:

generating a first result based on applying the first set of predicted values to the cumulative sums algorithm;

computing a second set of predicted data values using a second predictive model;

applying the second set of predicted data values to the cumulative sums algorithm for determining the data quality problem;

generating a second result based on applying the second set of predicted data values to the cumulative sums algorithm;

determining convergence of the first result and second result;

producing a first output in response to determining that the first result and second result have converged; and producing a second output in response to determining that the first result and second result have not converged.

* * * * *

UNITED STATES PATENT AND TRADEMARK OFFICE
CERTIFICATE OF CORRECTION

PATENT NO. : 7,505,868 B1 Page 1 of 1
APPLICATION NO. : 11/117989
DATED : March 17, 2009
INVENTOR(S) : Jerry Z. Shan It is certified that error appears in the above-identified patent and that said Letters Patent is hereby corrected as shown below:

In column 3, line 43, delete "GRL" and insert -- GLR --, therefor.

In column 6, line 47, delete "additional" and insert -- addition --, therefor.

In column 6, line 52, after "model," insert -- a --.

In column 9, line 49, delete " $s^*=\min\{s:C(s|t)=\Sigma_{i=1}^{s}r_i(t)\leq c\}$ " and insert -- $s^* = \min\{s:C(s|t) = \sum_{i=1}^{s} r_i(t) \geq c\}$ --, therefor.

In column 11, line 19, delete "This" and insert -- The --, therefor.

In column 11, line 50, in Equation 11, delete " $\dfrac{1}{S_t} \dfrac{f_{R_i}(S_i/S_t) f_{S_i}(S_t)}{f_{S_i}(S_i)}$ " and insert -- $\dfrac{1}{S_t} \dfrac{f_{R_i}(S_i/S_t) f_{S_i}(S_t)}{f_{S_i}(S_i)}$ --, therefor.

In column 14, line 44, in Claim 13, delete "applying" and insert -- apply --, therefor.

Signed and Sealed this

Twenty-eighth Day of July, 2009

JOHN DOLL
*Acting Director of the United States Patent and Trademark Office*